(12) United States Patent
Takahashi et al.

(10) Patent No.: US 10,958,660 B2
(45) Date of Patent: Mar. 23, 2021

(54) INFORMATION PROCESSING APPARATUS AND ACCESS CONTROL METHOD

(71) Applicant: FUJITSU LIMITED, Kanagawa (JP)

(72) Inventors: Eiichi Takahashi, Kawasaki (JP); Miwa Okabayashi, Sagamihara (JP); Akira Shiba, Kawasaki (JP); Hisatoshi Yamaoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 442 days.

(21) Appl. No.: 15/881,852

(22) Filed: Jan. 29, 2018

(65) Prior Publication Data
US 2018/0248888 A1   Aug. 30, 2018

(30) Foreign Application Priority Data
Feb. 28, 2017  (JP) .............................. JP2017-036425

(51) Int. Cl.
| H04L 29/06 | (2006.01) |
| H04W 12/08 | (2021.01) |
| G06F 21/32 | (2013.01) |
| G06F 21/62 | (2013.01) |

(52) U.S. Cl.
CPC ............ *H04L 63/105* (2013.01); *G06F 21/32* (2013.01); *G06F 21/62* (2013.01); *H04L 63/08* (2013.01); *H04L 63/0861* (2013.01); *H04L 63/102* (2013.01); *H04W 12/08* (2013.01); *H04L 63/101* (2013.01)

(58) Field of Classification Search
USPC ....... 726/6, 2, 4, 21, 36; 713/150, 163, 181; 380/255, 264, 276
See application file for complete search history.

(56) References Cited

U.S. PATENT DOCUMENTS

| 4,633,391 A * | 12/1986 | Rundell | G06F 16/9017 |
| | | | 707/700 |
| 5,666,546 A * | 9/1997 | Donnan | G06F 9/526 |
| | | | 707/999.008 |
| 7,039,951 B1 * | 5/2006 | Chaudhari | G10L 17/06 |
| | | | 340/5.84 |

(Continued)

FOREIGN PATENT DOCUMENTS

| JP | 1996-137800 | 5/1996 |
| JP | 2006-260461 | 9/2006 |
| JP | 2006260461 A * | 9/2006 |

*Primary Examiner* — Sharif E Ullah
(74) *Attorney, Agent, or Firm* — Fujitsu Patent Center

(57) ABSTRACT

An information processing apparatus includes a processor that executes a process including calculating, for each of a plurality of registered users from which feature values have been obtained in advance, an index value indicating a probability of an authentication target being that registered user based on a matching degree between a feature value extracted from authentication information obtained from the authentication target and a feature value of that registered user, setting a synthesized access right by synthesizing, based on the index value, an access right of a certain one of the plurality of users to a plurality of resources and an access right of a user different from the certain registered user from among the plurality of registered users to the plurality of resources, and permitting the authentication target an access to a resource to which an access is permitted in the synthesized access right.

18 Claims, 29 Drawing Sheets

(56) References Cited

U.S. PATENT DOCUMENTS

| | | | | |
|---|---|---|---|---|
| 7,761,441 | B2* | 7/2010 | Chung | G06F 16/90335 |
| | | | | 707/706 |
| 10,755,314 | B2* | 8/2020 | Rudrappa | G06Q 30/0269 |
| 2001/0027451 | A1* | 10/2001 | Taguchi | G06F 16/38 |
| 2002/0184538 | A1* | 12/2002 | Sugimura | G06F 21/32 |
| | | | | 726/5 |
| 2003/0048173 | A1* | 3/2003 | Shigematsu | G06F 21/32 |
| | | | | 340/5.52 |
| 2008/0120280 | A1* | 5/2008 | Iijima | G06F 16/81 |
| 2010/0097179 | A1* | 4/2010 | Hayashida | G06F 21/32 |
| | | | | 340/5.82 |
| 2016/0029954 | A1* | 2/2016 | Sato | A61B 5/6804 |
| | | | | 702/141 |
| 2017/0039868 | A1* | 2/2017 | Okumura | G09B 5/14 |
| 2017/0093920 | A1* | 3/2017 | Ducatel | H04L 63/20 |

* cited by examiner

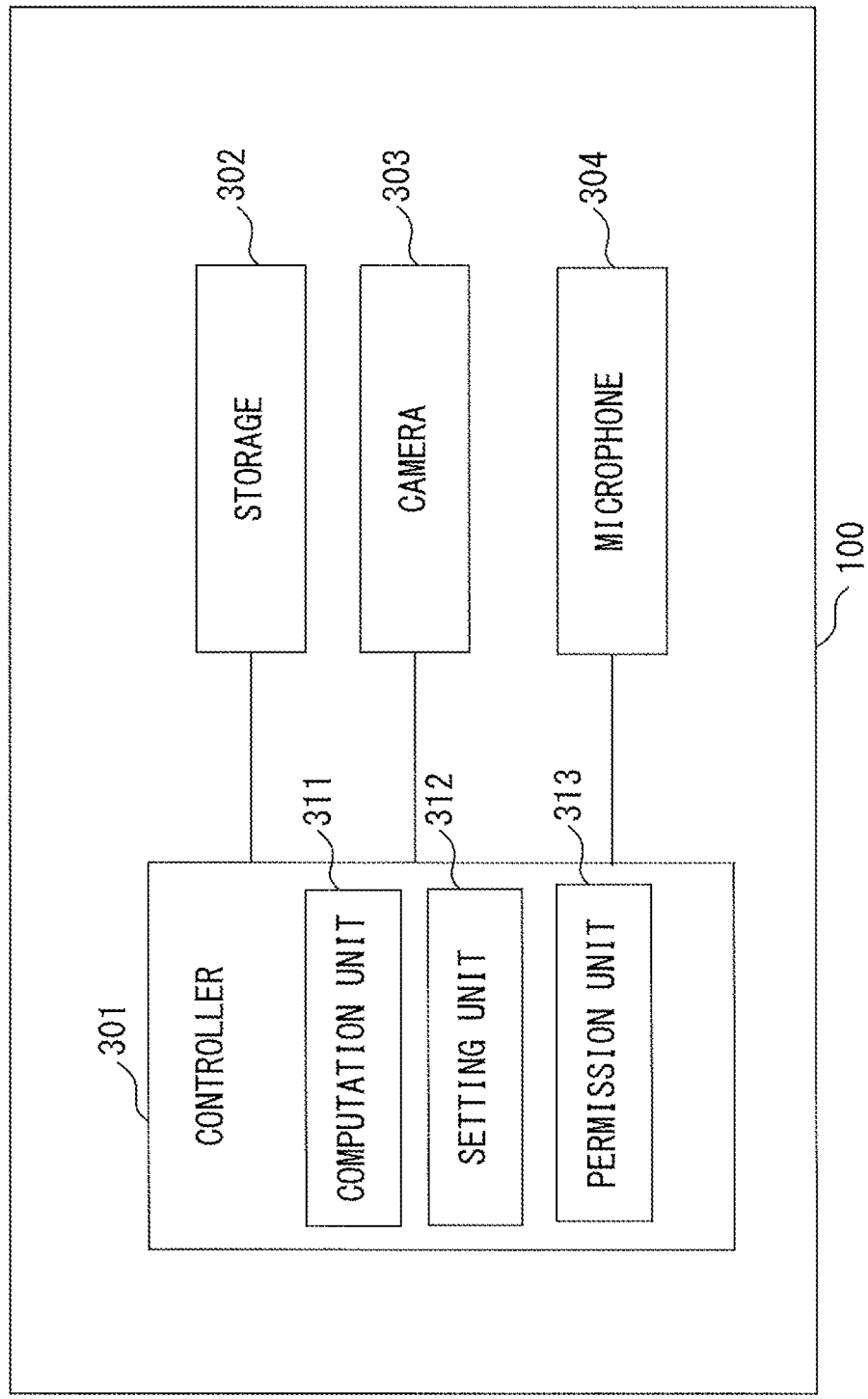

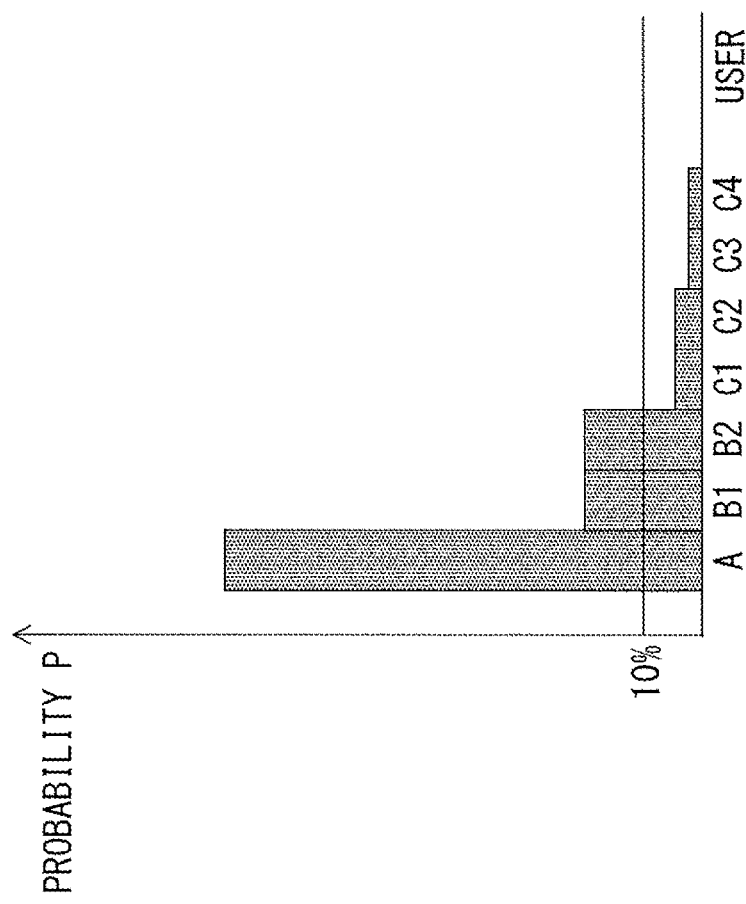

FIG. 4B

| USER | PROBABILITY P |
|------|---------------|
| A    | 60%           |
| B1   | 15%           |
| B2   | 15%           |
| C1   | 4%            |
| C2   | 4%            |
| C3   | 1%            |
| C4   | 1%            |

| USER | COMPANY'S NAME | SCHEDULE | REPORT | MAIL |
|---|---|---|---|---|
| A | ○ | ○ | ○ | ○ |
| B1 | ○ | ○ | ○ | × |
| B2 | ○ | ○ | × | × |
| C1 | ○ | × | × | × |
| C2 | ○ | × | × | × |
| C3 | ○ | × | × | × |
| C4 | ○ | × | × | × |

| COMPANY'S NAME | SCHEDULE | REPORT | MAIL |
|---|---|---|---|
| ◯ | ◯ | × | × |

501

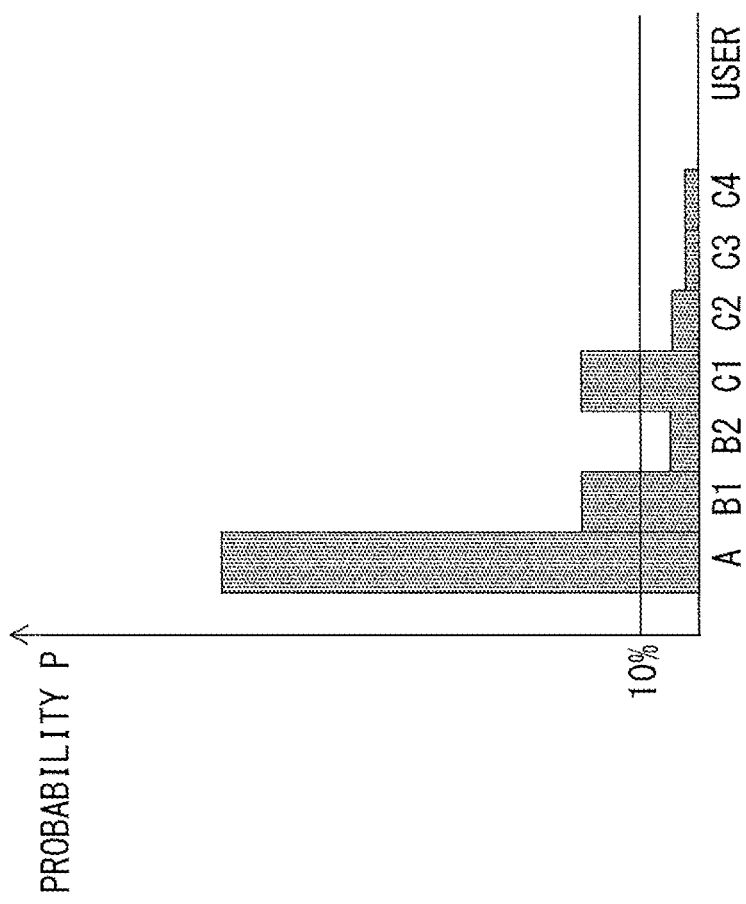

| USER | PROBABILITY P |
|---|---|
| A | 60% |
| B1 | 15% |
| B2 | 4% |
| C1 | 15% |
| C2 | 4% |
| C3 | 1% |
| C4 | 1% |

F I G. 6 B

| USER | COMPANY'S NAME | SCHEDULE | REPORT | MAIL |
|---|---|---|---|---|
| A | ○ | ○ | ○ | ○ |
| B1 | ○ | ○ | ○ | × |
| B2 | ○ | ○ | × | × |
| C1 | ○ | × | × | × |
| C2 | ○ | × | × | × |
| C3 | ○ | × | × | × |
| C4 | ○ | × | × | × |

FIG. 7A

| COMPANY'S NAME | SCHEDULE | REPORT | MAIL |
|---|---|---|---|
| ○ | × | × | × |

| USER INFORMATION | FEATURE VALUE |
|---|---|
| A | *** |
| B1 | *** |
| B2 | *** |
| C1 | *** |
| C2 | *** |
| C3 | *** |
| C4 | *** |
| ... | ... |

| USER | PROBABILITY P |
|------|---------------|
| A | 60% |
| B1 | 15% |
| B2 | 15% |
| C1 | 4% |
| C2 | 4% |
| C3 | 1% |
| C4 | 1% |

| USER | ROLE |
|---|---|
| A | PERSON HIMSELF/HERSELF |
| B1 | TEAM MEMBER |
| B2 | EMPLOYEE |
| C1 | CUSTOMER |
| C2 | CUSTOMER |
| C3 | CUSTOMER |
| C4 | CUSTOMER |

| ROLE | COMPANY'S NAME | SCHEDULE | REPORT | MAIL |
|---|---|---|---|---|
| PERSON HIMSELF/HERSELF | ○ | ○ | ○ | ○ |
| TEAM MEMBER | ○ | ○ | ○ | × |
| EMPLOYEE | ○ | ○ | × | × |
| CUSTOMER | ○ | × | × | × |

FIG. 10C

ACCESS CONTROL LIST OF USER A

| USER | COMPANY'S NAME | SCHEDULE | REPORT | MAIL |
|------|----------------|----------|--------|------|
| A | ○ | ○ | ○ | ○ |
| B1 | ○ | ○ | ○ | × |
| B2 | ○ | ○ | × | × |
| C1 | ○ | × | × | × |

ACCESS CONTROL LIST OF USER B1

| USER | COMPANY'S NAME | SCHEDULE | REPORT | MAIL |
|------|----------------|----------|--------|------|
| A    | ○              | ○        | ○      | ×    |
| B1   | ○              | ○        | ○      | ○    |
| B2   | ○              | ×        | ×      | ×    |
| C1   | ○              | ×        | ×      | ×    |

SYNTHESIZED ACCESS CONTROL LIST

| USER | COMPANY'S NAME | SCHEDULE | REPORT | MAIL |
|---|---|---|---|---|
| PERSON HIMSELF/HERSELF | ○ | ○ | ○ | × |
| B2 | ○ | × | × | × |
| C1 | ○ | × | × | × |

1100

| USER | ON/OFF | TEMPERATURE SETTING | OUTPUT SETTING | TIMER SETTING |
|---|---|---|---|---|
| B1 | ○ | ○ | ○ | ○ |
| B2 | ○ | ○ | ○ | × |
| B3 | ○ | ○ | × | × |
| B4 | ○ | × | × | × |

| USER | PROBABILITY P |
|------|---------------|
| A | 60% |
| B1 | 15% |
| B2 | 15% |
| C1 | 4% |
| C2 | 4% |
| C3 | 1% |
| C4 | 1% |

| USER | COMPANY'S NAME | SCHEDULE | REPORT | MAIL |
|---|---|---|---|---|
| A | ○ | ○ | ○ | ○ |
| B1 | ○ | ○ | ○ | × |
| B2 | ○ | ○ | × | × |
| C1 | ○ | × | × | × |
| C2 | ○ | × | × | × |
| C3 | ○ | × | × | × |
| C4 | ○ | × | × | × |

F I G. 1 3 B

| USER | PROBABILITY P | COMPANY'S NAME | SCHEDULE | REPORT | MAIL |
|---|---|---|---|---|---|
| A | 60% | ○ | ○ | ○ | ○ |
| B1 | 15% | ○ | ○ | ○ | × |
| B2 | 15% | ○ | ○ | × | × |
| C1 | 4% | ○ | × | × | × |
| C2 | 4% | ○ | × | × | × |
| C3 | 1% | ○ | × | × | × |
| C4 | 1% | ○ | × | × | × |
| | DETERMINATION MISTAKE RATE | 0% | 10% | 25% | 40% |

TOLERABLE MISTAKE RATE $\beta = 15\%$

FIG. 13C

| USER | PROBABILITY P | COMPANY'S NAME | SCHEDULE | REPORT | MAIL |
|---|---|---|---|---|---|
| A | 60% | ○ | ○ | ○ | ○ |
| B1 | 15% | ○ | ○ | ○ | × |
| B2 | 4% | ○ | ○ | × | × |
| C1 | 15% | ○ | × | × | × |
| C2 | 4% | ○ | × | × | × |
| C3 | 1% | ○ | × | × | × |
| C4 | 1% | ○ | × | × | × |
| | DETERMINATION MISTAKE RATE | 0% | 21% | 25% | 40% |

TOLERABLE MISTAKE RATE $\beta = 15\%$

FIG. 14

INFORMATION PROCESSING APPARATUS AND ACCESS CONTROL METHOD

CROSS-REFERENCE TO RELATED APPLICATION

This application is based upon and claims the benefit of priority of the prior Japanese Patent Application No. 2017-036425, filed on Feb. 28, 2017, the entire contents of which are incorporated herein by reference.

FIELD

The embodiments discussed herein are related to an information processing apparatus and an access control method.

BACKGROUND

In recent years, services such as digital signage that use Information and Communication Technology (ICT) have begun providing interactively personalized information. In these services, for example, an individual person is identified by using an authentication technique such as facial image recognition, voice recognition, etc. and the service is provided by using the personal information. Thereby, services that are tailored to individual persons while being directed to unspecified people are provided. Meanwhile, accompanying an increase in services utilizing personal information, more attention has been paid to the protection of personal information, and techniques related to control of accesses to information have been developed (see for example Patent Document 1 and Patent Document 2).

Patent Document 1: Japanese Laid-open Patent Publication No. 2006-260461

Patent Document 2: Japanese Laid-open Patent Publication No. 08-137800

SUMMARY

According to an aspect of the embodiment, an information processing apparatus includes a memory, and a processor that is coupled to the memory and that is configured to perform a process including calculating, for each of a plurality of registered users from which feature values have been obtained in advance, an index value indicating a probability of an authentication target being that registered user based on a matching degree between a feature value extracted from authentication information obtained from the authentication target and a feature value of that registered user, setting a synthesized access right by synthesizing, based on the index value, an access right of a certain one of the plurality of users to a plurality of resources and an access right of a user different from the certain registered user from among the plurality of registered users to the plurality of resources, and permitting the authentication target an access to a resource to which an access is permitted in the synthesized access right.

The object and advantages of the embodiment will be realized and attained by means of the elements and combinations particularly pointed out in the claims.

It is to be understood that both the foregoing general description and the following detailed description are exemplary and explanatory and are not restrictive of the embodiment.

BRIEF DESCRIPTION OF DRAWINGS

FIG. 3 illustrates an example of a block configuration of an information processing apparatus according to an embodiment;

FIG. 4A and FIG. 4B illustrate, for each user registered for a service provided by an information processing apparatus of the first embodiment, an example of a probability of an authentication-target user being that user;

FIG. 5A and FIG. 5B illustrate examples of an access control list and access control information in the case of FIG. 4A and FIG. 4B;

FIG. 6A and FIG. 6B illustrate, for each user registered for a service provided by the information processing apparatus of the first embodiment, another example of a probability of an authentication-target user being that user;

FIG. 7A and FIG. 7B illustrate examples of an access control list and access control information in the case of FIG. 6A and FIG. 6B;

FIG. 8 illustrates an example of feature value information according to an embodiment;

FIG. 10A, FIG. 10B and FIG. 10C illustrate an example of access control in a case when a role is used;

FIG. 11A, FIG. 11B, FIG. 11C and FIG. 11D illustrate an example in which a probability of a candidate for being the person himself/herself and a probability of being a false-authentication candidate are close to each other;

FIG. 12A and FIG. 12B illustrate an example of authentication in a case when an access control list specifying an access right related to control of a device is used;

FIG. 13A, FIG. 13B and FIG. 13C explain the calculation of a determination mistake rate according to a second embodiment;

FIG. 14 illustrates an example of the calculation of a determination mistake rate from a different authentication result;

DESCRIPTION OF EMBODIMENTS

Preferred embodiments of the present invention will be explained with reference to accompanying drawings. Note that elements corresponding across a plurality of drawings are denoted by similar symbols.

In authentication such as face authentication, voiceprint authentication, etc. for example, authentication is performed by an information processing apparatus picking up an image of the user or receiving the input of the voice of the user, and thereby the user conducts authentication easily. However, in some types of authentication schemes such as face authentication, voiceprint authentication, etc. for example, the authentication accuracy is low. In such a case, there is a case in which information will be leaked to a user who is different from the original user to whom for example the personal information presented by an information processing apparatus belongs. Meanwhile, when the protection of information is increased so that the information will not be leaked to an unintended person, the burden on the user in the authentication will increase, leading to deterioration in convenience in the service. For example, long passwords lead to an increased burden of memorizing and inputting them. Also, ID cards are inconvenient because it is not possible to use the service unless the user is carrying it. Hereinafter, explanations will be given for embodiments in which a safe access right can be granted even when the authentication accuracy is low.

Services that use ICT have begun providing interactively personalized information. In a responsive service such as these, an information processing apparatus that provides a response service identifies a user who input information to that information processing apparatus or a user who approached within a prescribed distance in the image-pickup scope of a camera provided in that information processing apparatus, from among users registered for the service. Then, the information processing apparatus accesses the personal information of the identified user so as to provide information to him or her. In digital signage for example, a technique of providing information suitable for each user in accordance with personal information of the user is developed. A technique is also developed by which a company places a robot at a reception in its facility so as to make that robot provide visitors with information in accordance with their needs.

Figure 1A:
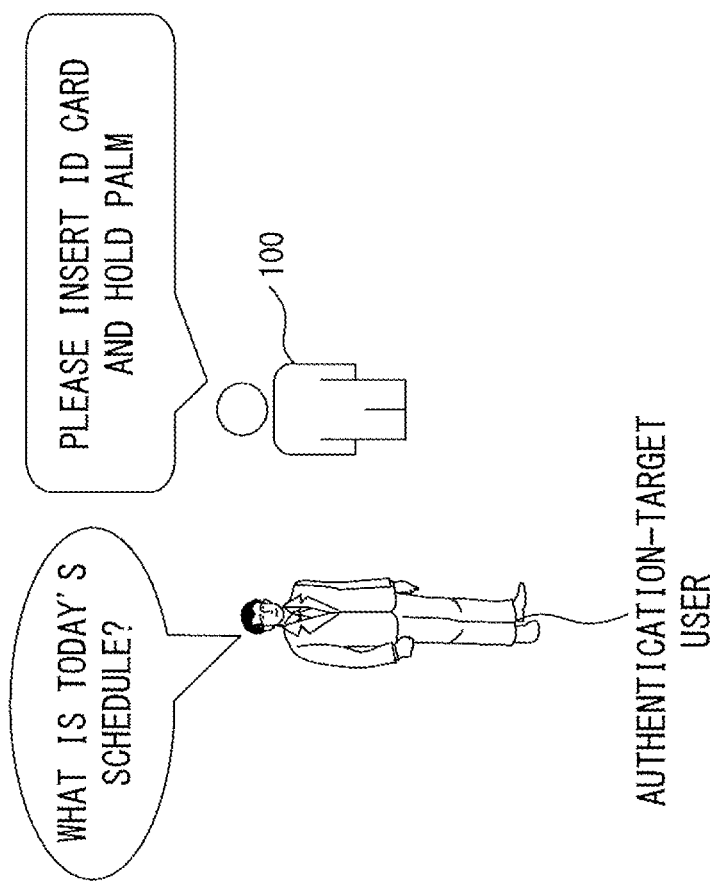
FIG. 1A and FIG. 1B illustrate examples of input of authentication information to an information processing apparatus.
Figure 1B:
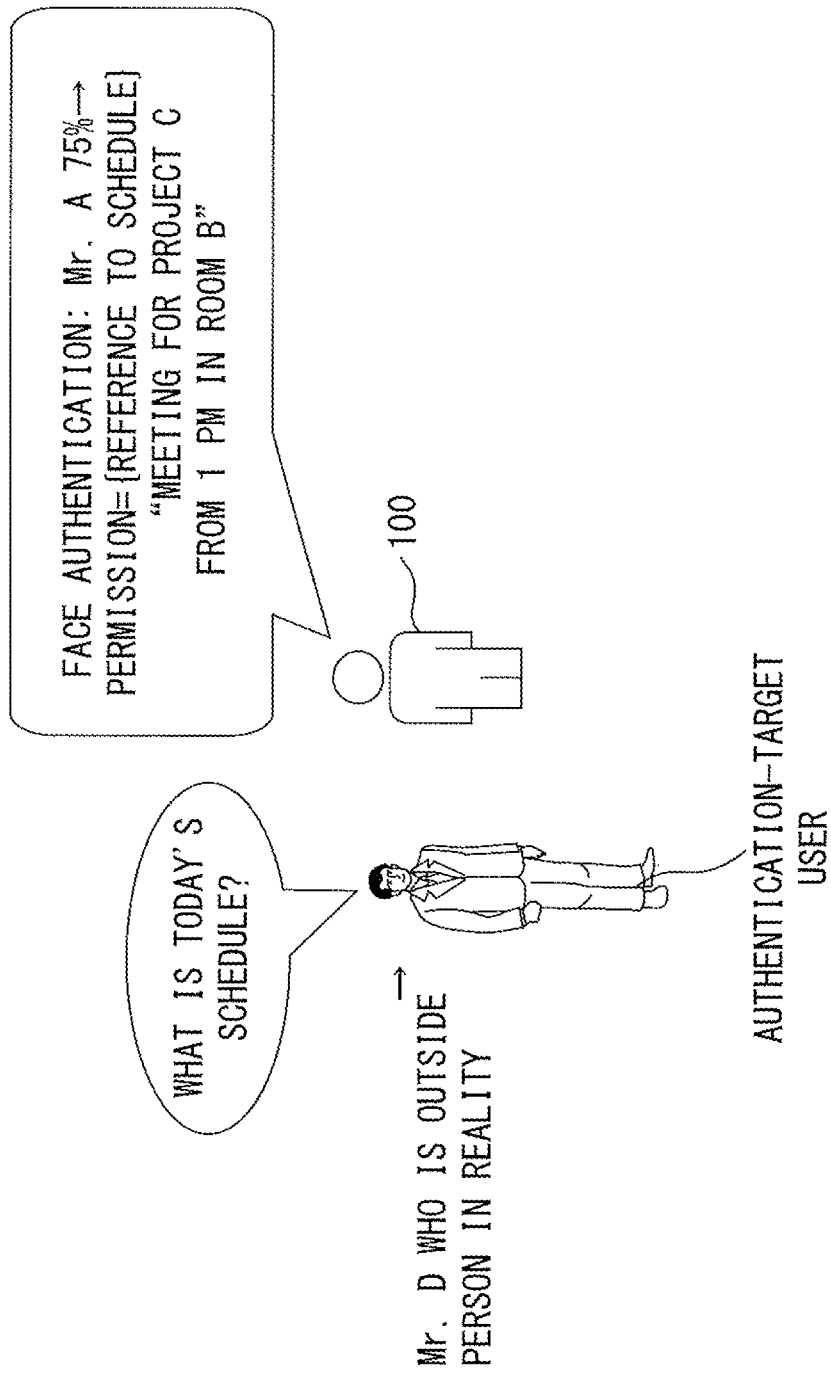

FIG. 1A and FIG. 1B illustrate examples of an input of authentication information to an information processing apparatus 100 such as a reception robot etc. placed at a reception of a company or a facility. The information processing apparatus 100 performs for example the authentication of a visiting user, and provides information in accordance with the user. FIG. 1A illustrates an example in which it is requested that a user visiting the information processing apparatus 100 input the ID (identifier) card or the password, and the authentication is performed. Authentication based on an ID card or a password yields a high user authentication accuracy, making it possible to reduce a possibility of erroneously providing information of a user to a different user. However, users bear a heavy burden for authentication, such as carrying ID cards, remembering passwords to input them for authentication, etc. As described above, when protection is increased so as to prevent information such as personal information etc. from being given to unintended people, the burden in the authentication of users increases, leading to deteriorated convenience for the service.

FIG. 1B illustrates an example in which the information processing apparatus 100 performs authentication of a user by using an authentication scheme that imposes a lighter burden of inputting in the authentication of users, such as face authentication, voiceprint authentication, etc. In such a case, the user conducts authentication by for example getting close to the information processing apparatus 100 and inputting an image of himself or herself through the camera provided to the information processing apparatus 100 or by vocalizing so as to input a voice through a microphone provided to the information processing apparatus 100. Accordingly, the user easily inputs information for authentication to the information processing apparatus 100. However, in face authentication for example, the authentication accuracy may sometimes become lower, depending upon image-pickup conditions such as the angle of picking up an image of the user's face, light conditions, etc. Also, in voiceprint authentication similarly, the authentication accuracy may become lower due to environmental sounds etc.

that may be made when the input of the user's voice is received. As described above, authentication accuracy may sometimes become lower depending upon the authentication schemes. In FIG. 1B, for example, because the information processing apparatus 100 has identified the authentication-target user as user A on the basis of determining the probability of being user A to be 75%, there is a possibility of being another user with a probability of 25%. When the information processing apparatus 100 presents the authentication-target user with highly confidential information related to user A in such a situation, there is a possibility of information being leaked in a case when the authentication-target user is a user different from user A in reality. Thus, there is a demand for the provision of a technique that secures the security of information of a user while reducing the burden in the authentication of the user and maintaining the convenience. Note in the explanations below that a target for which control of permission and rejection of an access made by an authentication-target user is performed may sometimes be referred to as a resource. A resource may include for example information, a service, a device, etc.

Regarding this, the present inventors noticed that a determination of whether or not to permit an access to overall resources of a certain user managed by a service based on a binary value representing whether or not a user is the user himself/herself leads to the necessity for the securement of high security for the authentication. In other words, because authentication is performed as a binary value, when false authentication occurs, a person who is not the person himself/herself is permitted to utilize all the resources or, inversely, the person himself/herself is regarded as a different person and prevents to use the resources at all. This leads to the need for a highly accurate authentication scheme such as one using long passwords, ID cards, etc. for securing the safety, which increases the burden on the user.

Also, personal information includes for example information for which high security is needed, such as for example a passcode of a cash card. Meanwhile, it includes information for which low security is sufficient, such as for example a monthly schedule, which may be known to family members without causing problems. For services and devices as well, there is also control of a service or device for which high security is needed and control of a service or device that may be managed relatively loosely. However, in access control of a binary value such as one in which accesses to all resources made by the user are permitted depending upon a result of authentication or accesses to all resources are rejected when the authentication fails, all standards need to be based on the standard of the authentication for resources for which the highest security is needed. Thus, an authentication scheme that yields high security is used in an access control of a binary value such as these, increasing the burden on the authentication of the user and deteriorating the convenience.

In view of this, it may be possible to control accesses in a such manner for example that the higher the probability of a person being the person himself/herself, the higher the security of resources up to which he or she is permitted to access is needed to be, instead of using a binary value for controlling accesses to a plurality of resources. It is may also be possible for example to control accesses in such a manner that the lower the probability of a person being the person himself/herself, the lower the security of resources to which his or her access is limited. This can attain both security and the convenience.

Also, even for a resource for which low security is enough for example, there is a case where it is not possible to determine, on the basis of only the probability of a person being the person himself/herself, whether or not to permit the use. It is assumed for example that low security is set for the information of a schedule for the reason that the schedule may be known to members of the same company without causing problems. In other words, it is assumed for example that it is set such that even when the probability of a person being the person himself/herself is low, the access is permitted. In this setting, when the person authenticated by false authentication is a person outside the company, the schedule is made public to an unintended person. Then, even when for example the threshold for giving access permission with respect to the probability of a person being the person himself/herself is somewhat increased, it does not prevent the information from being leaked as long as there is a possibility that an unintended person (a person outside the company in this case) will be authenticated as the person himself/herself by false authentication. As a result, authentication with the same accuracy as that for a resource that demands high security is needed, deteriorating the convenience. Or, resources for which permission can be given even when the probability of a person being the person himself/herself is low are limited to resources for which accesses can be permitted to anyone after all. Further, is not possible to treat a resource for which it is desirable that whether or not to permit the usage of it be determined depending upon a condition (whether or not the person is a person inside the company) when a case is taken into consideration where a person who is not the person himself/herself is erroneously authenticated by false authentication as in the above case of the information of a schedule. Accordingly, there is a demand for the provision of an access control technique which yields high security and high convenience and by which, when false authentication occurs, an access is permitted by also taking into consideration the information of a user who was erroneously authenticated to be the user himself/herself who is to be authenticated.

It is assumed in the embodiments described below that for example authentication is performed and a authentication-target user is identified as a certain user. In such a case, the information processing apparatus 100 performs access control by also taking into consideration an access right belonging to a user who is different from the certain user and who has a high probability of being the authentication-target user in addition to performing access control by taking into consideration an access right of the certain user.

Figure 2:
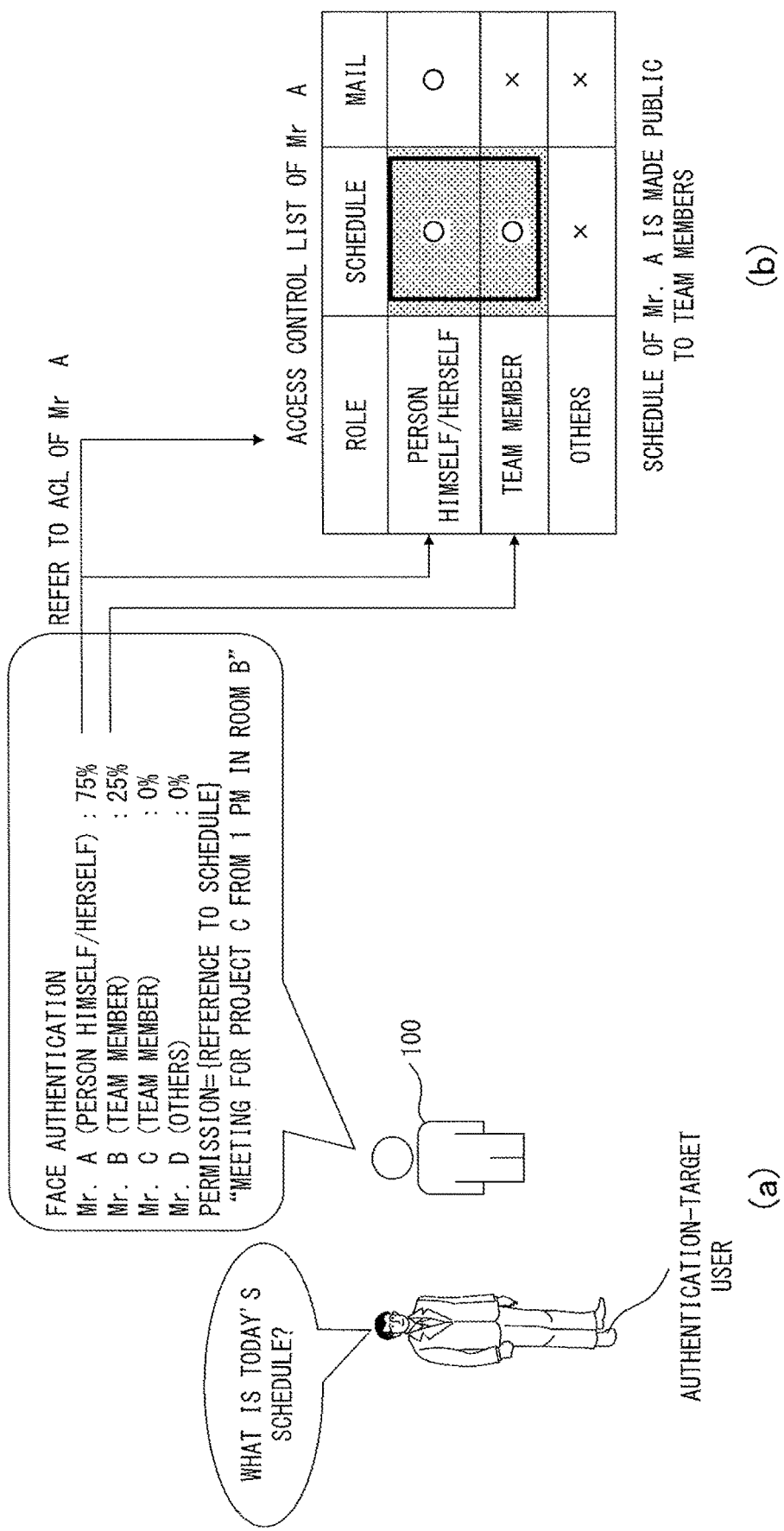
FIG. 2 illustrates an example of access control according to an embodiment.

FIG. 2 illustrates an example of access control according to an embodiment. As illustrated in (a) of FIG. 2, it is assumed for example that the information processing apparatus 100 has determined the probability of user A being the authentication-target user to be 75%, which is the highest. In such a case, user A has the highest probability of being the person himself/herself, who is the authentication target, and thus is a candidate for being the person himself/herself. It is assumed also that the information processing apparatus 100 has determined that the probability of the second most likely user being user B is 25%. In such a case, the probability of the authentication target being user B is 25%, which is remarkably higher than other users C and D, and the value is equal to or greater than 20%, which means that it has a probability above a certain level. Accordingly, in a case when the authentication target is not user A and the estimation of the candidate for being the person himself/herself is wrong, it is possible to estimate that the possibility of an authentication target being user B is high. As described above, user B is a candidate at a time of a false determination that involves a possibility that user B may have not been determined to be the person himself/herself although user B is actually the person himself/herself. Hereinafter, such a user who is a candidate at a time of a false determination will sometimes be referred to as a false-determination candidate. In such a case, in addition to permitting an access by simply referring only to an access authority of a resource of user A as a candidate for being the person himself/herself, the information processing apparatus 100 controls accesses by referring also to an access authority, of user B as a false-determination candidate, to a resource of user A. In FIG. 2, (b) illustrates an access control list specifying whether or not to permit accesses to resources related to user A. Note that the access control list will be described later in detail by referring to FIG. 5A and FIG. 5B.

In FIG. 2, in the access control list illustrated in (b) that is related to resources of user A, accesses to the schedule and the mail are both permitted to user A. Also, user A has made for example his/her schedule public to the members of the same team. Accordingly, an access to the schedule of user A has been permitted to user B, who belongs to the same team. The information processing apparatus 100 obtains for example a logical product between the "schedule and mail" that are permitted to user A, who is the candidate for being the person himself/herself having the highest possibility of being the authentication target, and the "schedule" that is permitted to user B, who is the false-determination candidate having the second highest possibility in a case when user A is not the person himself/herself. Specifically, the information processing apparatus 100 may permit for example an access to a schedule that is permitted to user A as a candidate for being the person himself/herself and user B as a false-determination candidate. Meanwhile, the information processing apparatus 100 may suppress the use of mail that is permitted to user A as a candidate for being the person himself/herself and that is not permitted to user B as a false-determination candidate. Accordingly, the authentication-target user can access the schedule. Meanwhile, even when the authentication of the user is false and the user is not user A but user B, an access to mail which user A wants to be confidential is restricted, and the safety of data is maintained.

As described above, according to the embodiment, in case of false authentication, an access right is granted to the authentication-target user, the access right being restricted to a scope of access rights of a false-authentication candidate having a high possibility of being the actual authentication target. Accordingly, even when the authentication accuracy is low and false authentication occurs, an access right is prevented from being given to an unintended person. Also, by granting an access right as described above, even when authentication is performed by using an authentication scheme that sometimes results in a low authentication accuracy, security is increased while maintaining convenience. Hereinafter, the embodiments will be explained in further detail.

FIG. 3 illustrates an example of a block configuration of the information processing apparatus 100 according to the embodiment. The information processing apparatus 100 includes for example a controller 301, a storage 302, a camera 303 and a microphone 304. The controller 301 operates as for example an computation unit 311, a setting unit 312, a permission unit 313, etc. The storage 302 of the information processing apparatus 100 stores for example information such as an access control list 500, feature value information 800, etc., which will be described later. For example, when the authentication scheme uses face authentication, the camera 303 picks up an image so as to output the image to the controller 301. When the authentication scheme uses voice authentication for example, the microphone 304 receives input of a sound so as to output the data of the output sound to the controller 301. These respective units and information stored in the storage 302 will be described later in detail.

First Embodiment

The first embodiment will be explained by referring to FIG. 4 through FIG. 9.

First, by referring to FIG. 4 through FIG. 7, an access control according to the first embodiment will be explained. FIG. 4A and FIG. 4B illustrate, for each of the users registered for the service provided by the information processing apparatus 100 of the first embodiment, an example of a probability of an authentication-target user being that user. Note that these probabilities are obtained in for example the following manner below.

For example, when a user makes a request to the information processing apparatus 100 for permission to refer to a schedule, mail, etc., the controller 301 of the information processing apparatus 100 regards the user who has input the request as the authentication target, and obtains authentication information such as a photograph of his/her face obtained by the camera 303, the user's voice picked up by the microphone 304, etc. For example, the controller 301 obtains, for each user (U1, ..., Un) registered in the feature value information 800 of the storage 302 who are to receive the information provision service, a probability of the authentication-target user being that user, on the basis of the input authentication information. Note that a user registered in the feature value information 800 may also be referred to as a registered user hereinafter. The feature value information 800 will be described later in detail. In a case for example when the authentication information is an image picked up by the camera 303, the controller 301 extracts the face from the image so as to obtain the feature value of the face. Feature values may be obtained by using for example a known scheme such as ones using Haar-like features, LBP features, etc. Next, the feature value of each registered user (U1, ..., Un) is obtained in advance, and the feature value of each registered user and the feature value of the authentication-target user are compared, and a probability Pi of the authentication-target user being user Ui is obtained. The calculation of probabilities may be performed by using a known method in an example. For example, a feature value is expressed in vectors and the Euclidean distance is obtained between the two feature values. Also, the probability may be calculated in a manner in which inverse numbers are obtained by adding one to the respective Euclidean distances obtained for respective registered users and the probability is treated as a ratio at which the obtained inverse number accounts for each of the registered users in a case where the number obtained by adding those inverse numbers is treated as 100.

FIG. 4A illustrates a distribution of the probabilities of the authentication-target user being registered users respectively. FIG. 4B illustrates such probabilities in a form of data on a table. In the example of FIG. 4A and FIG. 4B, the probability of the authentication-target user who input the authentication information being user A is 60%, which is the highest, and the probability of the authentication-target user being user B1 and user B2 is 15%, which is the second highest. Also, in the embodiment, for example, a threshold is set for extracting a user having a probability of being the authentication-target user that is so high that there is concern that there is a risk of false authentication. For example, the threshold is set to be 10% in FIG. 4A and FIG. 4B, and in such a case, the controller 301 extracts user A, user B1 and user B2, who have probabilities higher than 10% as the threshold. Note that user A has the highest probability of being the authentication-target user and is a candidate for being the person himself/herself, and user B1 and user B2 are false-authentication candidates having probabilities that are higher than the threshold. Then, the controller 301 obtains, from the storage 302, the access control list 500 of user A who is the candidate for being the person himself/herself with the highest probability of being the authentication-target user.

FIG. 5A is an example of the access control list 500 of user A in the case of FIG. 4A and FIG. 4B. In the access control list 500, relationships between a plurality of resources that are targets of accesses and an access authority of each user to the plurality of resources are registered. The access control list 500 specifies whether to permit (circle mark) or reject (cross mark) an access by a registered user to each resource. Note that while FIG. 5A illustrates the access control list 500 used in a case when access permission is set in units of resources, whether or not to permit an access may be set for each operation (for example reading, writing, executing, etc.) on a resource in a different embodiment. In this example, explanations will be given for a case where whether or not to permit an access is set in units of resources. Also, the access control list 500 may be generated for each of a plurality of registered users. Specifically, it is assumed that a combination of access rights of a plurality of respective registered users to a plurality of resources of a certain registered user is treated as one set (i.e., an access right registered in the access control list 500). Then, a plurality of sets of access rights corresponding to a plurality of respective registered users (i.e., a plurality of the access control lists 500) may be stored in the storage 302.

Figure 5B:
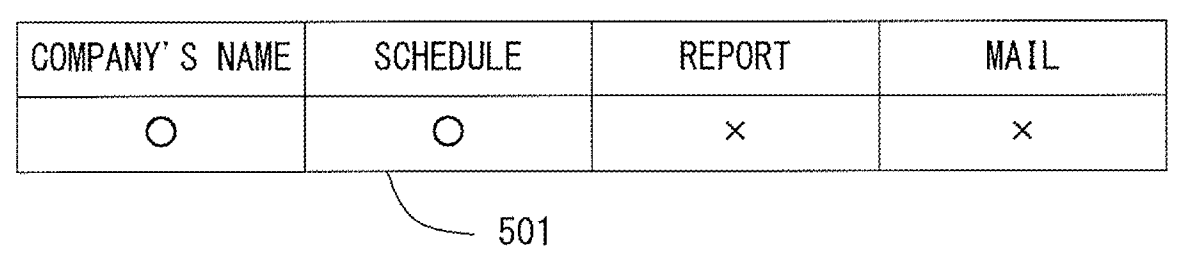

In the example of FIG. 5A, user A is permitted to access all the resources of user A. By contrast, user B1 and user B2 are permitted to access the company's name and the schedule of user A, and the other users are permitted to access only the company's name. Then, users exceeding the threshold (10% in this example) are user A, user B1 and user B2, and thus the controller 301 selects user A, user B1 and user B2 as candidates for which access rights are synthesized. The controller 301 may for example synthesize access rights by obtaining a set of logical products of the access rights of user A, user B1 and user B2 from the access control list 500 so as to generate the access control information 501 as illustrated in FIG. 5B. Specifically, the controller 301 for example may permit accesses to the company's name and schedule that are permitted for all of users A, B1 and B2 as illustrated in the thick frame in the table of FIG. 5A. Also, the controller 301 may set rejection in the access control information 501 so as to prevent accesses to the other items, i.e., the report and the mail, which at least one of the users is not permitted to use. As described above, in the embodiment, by synthesizing access rights of registered users that may be an authentication target with a probability higher than a prescribed threshold, a synthesized access right is granted to an authentication-target user and generates the access control information 501. Thereby, even when authentication involves an error and the authentication target is not user A but user B1 or user B2, an unauthenticated access to resources of user A is prevented.

FIG. 6A and FIG. 6B illustrate, for each of the users registered for the service provided by the information processing apparatus 100 of the first embodiment, another example of a probability of an authentication-target user being that user. Similarly to the case described for FIG. 4A and FIG. 4B, it is assumed for example that authentication information such as a photograph of the face picked up by the camera, the user's voice picked up by the microphone, etc. is input into the controller 301 of the information processing apparatus 100. The controller 301 obtains, for each registered user (U1, . . . , Un) who receives the information provision service stored in the storage 302, a probability (P1, . . . Pn) of the authentication-target user being that registered user, on the basis of the input authentication information. The controller 301 may obtain for example the data Euclidean distance between the feature value of the authentication-target user and the feature value of registered user from the feature value of Haar-like features, LBP features, etc. so as to obtain, for each of the registered users, a probability that represents a possibility of being that user.

FIG. 6A illustrates a distribution of the probabilities of the authentication-target user being registered users respectively, and FIG. 6B illustrates the probabilities in a form of data on a table. In the example of FIG. 6A and FIG. 6B, the probability of the authentication-target user who input the authentication information being user A is 60%, which is the highest, and the probability of the authentication-target user being user B1 and user B2 is 15% each, which is the second highest. Also, in the embodiment, for example, a threshold is set for extracting a user having a possibility of being the authentication-target user that is so high that there is concern that there is a risk of false authentication. For example, the threshold is set to be 10% in the example of FIG. 6A and FIG. 6B, and in such a case, the controller 301 extracts user A, user B1 and user C1, who have probabilities higher than the threshold of 10%. Note that user A has the highest possibility of being the authentication-target user and is a candidate for being the person himself/herself, and user B1 and user C1 are false-authentication candidates having probabilities that are higher than the threshold. Then, the controller 301 obtains, from the storage 302, the access control list 500 of user A as the candidate for being the person himself/herself with the highest possibility of being the authentication-target user.

Figure 7B:
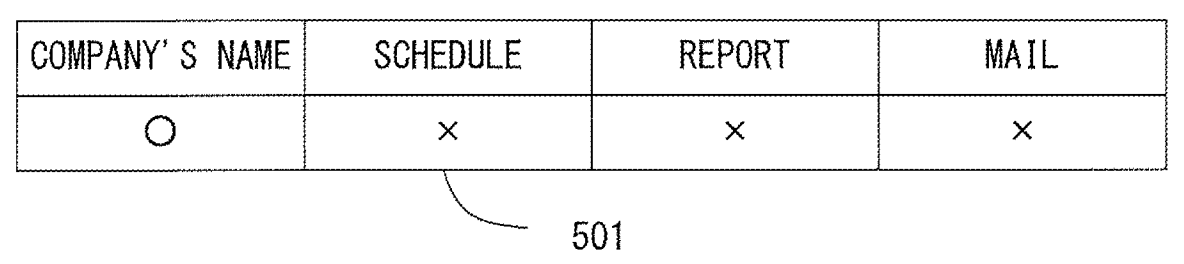

FIG. 7A illustrates an example of the access control list 500 of user A in the case of FIG. 6A and FIG. 6B. The controller 301 synthesizes access rights by obtaining a set of the logical products of the access authorities (in the thick frame in the table of FIG. 7A) of user A, user B1 and user C1, who are beyond the threshold (10% in this example) in the read access control list 500 of user A. Thereby, the controller 301 generates the access control information 501 as illustrated in FIG. 7B. Note that while the company's name and the schedule are permitted in the access control information 501 of FIG. 5B, only the company's name is permitted in FIG. 7B. As described above, in the embodiment, the access control information 501 is generated for an authentication target on the basis of a probability of each of the registered users being an authentication target, the probability being obtained as a result of performing authentication on an authentication target. As a result of this, a different access right is granted to an authentication target in accordance with a probability for each registered user obtained through authentication (i.e., the level of the reliability of the result of the authentication), and thereby access rights are controlled dynamically.

Note that the above embodiment exemplifies a case where the access control list 500 is generated for each registered user individually. Instead of this configuration, one access control list 500 may be used by all users in a shared manner, as will be explained later by referring to FIG. 12A and FIG. 12B.

FIG. 8 illustrates an example of feature value information 800 according to the embodiment. In the feature value information 800, for example a feature value of each of a plurality of users that the information processing apparatus 100 treats as targets of identification is registered. Note that a user registered in the feature value information 800 is a user registered for an information provision service and is the above registered user. Also, in the example of FIG. 8, user information for identifying a user and the feature value extracted from that user are registered in association with each other. Note that while one type of a feature value is registered in FIG. 8, a plurality of types of feature values such as Haar-like features, LBP features, etc. extracted from a facial image, and feature values such as voiceprints extracted from a sound may be registered for one user in a different embodiment.

Figure 9:
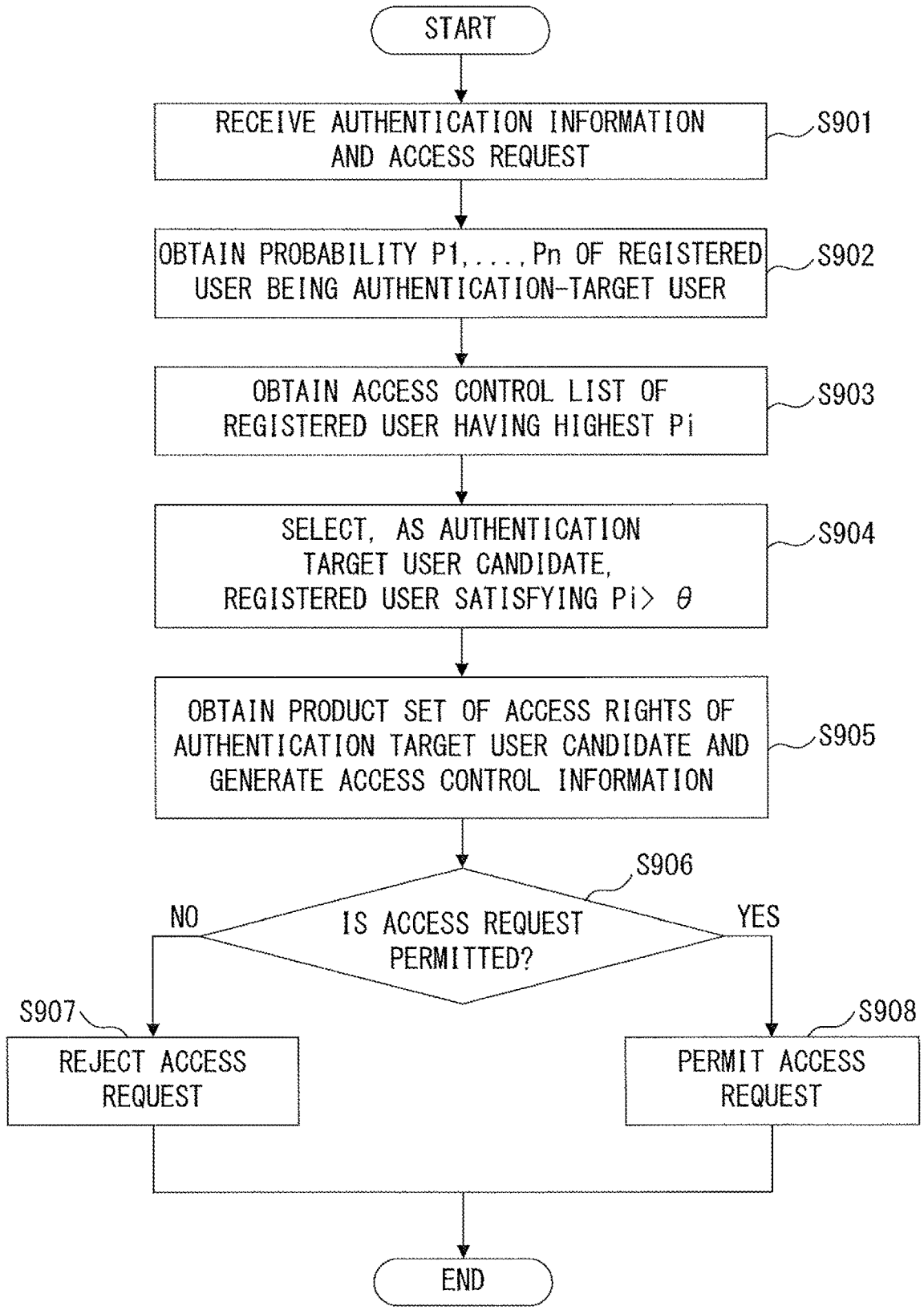
FIG. 9 illustrates an example of an operation flow of an access control process according to the first embodiment.

FIG. 9 illustrates an example of an operation flow of an access control process according to the first embodiment. The controller 301 of the information processing apparatus 100, when activated, starts the access control process of FIG. 9.

In step 901 (hereinafter, "step" is referred to as "S" such as in S901), the controller 301 receives input of authentication information and an access request from a user. For example, the user approaches within a prescribed distance from the camera provided to the information processing apparatus 100 or inputs a sound to the microphone provided to the information processing apparatus 100 by vocalizing so as to input authentication information to the information processing apparatus 100. Note that authentication information may be an image including a face in the case of face authentication, and may be data of for example a user's voice in the case of voiceprint authentication. Also, the user may manipulate a touch panel provided to the information processing apparatus 100 so as to input the access request to the information processing apparatus 100. The access request may be a request specifying a resource that the user wants to access. It is assumed in this example that a certain user has input for example a request to view certain information such as his or her schedule, mail, etc. Hereinafter, it is assumed that [[a]] this certain user is the authentication-target user.

In S902, the controller 301 performs the identification of the authentication-target user on the basis of the authentication information. For example, the controller 301 extracts the feature value from the authentication information of the input authentication-target user. Then, the controller 301 obtains a probability (P1, . . . , Pi, . . . , Pn) of a registered user being the authentication-target user on the basis of the similarities between the feature value of the authentication-target user and the feature value of each of the users registered in the feature value information 800. Note that "Pi" may represent for example a probability of each of the first through i-th registered users being the authentication-target user in the feature value information 800. Also, "n" may represent the number of the registered users. The calculation of this probability is performed by using for example a known technique. In one example, the calculation of this probability is performed by using a method in which the probability is determined on the basis of the closeness of the Euclidean distances obtained by expressing the feature values in a form of vectors.

In S903, the controller 301 reads, from the storage unit, the access control list 500 of the user having the maximum Pi. In S904, the controller 301 identifies, as an authentication target user candidate, a registered user having a probability of being the authentication-target user that is higher than a prescribed threshold θ, the probability being determined for each of the registered users. An authentication target user candidate may include for example a candidate for being the person himself/herself and a false-authentication candidate. Prescribed threshold θ may for example be a value that is set in advance. Also, from an experimental rule etc. based on an authentication method, prescribed threshold θ may be determined to be a value that makes it possible to extract a registered user having a high possibility of being the actual authentication target when false authentication occurs. For example, in the above case explained by referring to FIG. 4A and FIG. 4B, because threshold θ is set to be 10%, user A, user B1 and user B2 are selected as authentication target user candidates.

In S905, the controller 301 obtains a product set of access rights of the selected authentication target user candidates. For example, in the case explained by referring to FIG. 4A and FIG. 4B, the authentication target user candidates are user A, user B1 and user B2. Accordingly, the controller 301 generates the access control information 501 (FIG. 5B) that permits accesses to the resources to which accesses are permitted for all of users A, B1 and B2 in the access control list 500. In the access control information 501 illustrated in FIG. 5B, accesses to the resources (the company's name and the schedule) to which accesses are permitted to all the authentication target user candidates are permitted. Meanwhile, accesses are rejected to resources (the report and mail) to which accesses are rejected for at least one of the authentication target user candidates.

In S906, the controller 301 determines whether or not the access request input in S901 is permitted in the access control information 501. When the access request is not permitted in the access control information 501 (NO as the determination result in S906), the flow proceeds to S907, the controller 301 rejects the access request of the authentication-target user, and the present operation flow is terminated. When the access request is permitted in the access control information 501 (YES as the determination result in S906), the flow proceeds to S908, the controller 301 permits the access request of the authentication-target user, and the present operation flow is terminated. In such a case, by operating the information processing apparatus 100 for example, the authentication-target user can make an access to a resource to which he or she has been authenticated.

It is assumed that authentication resulted in, in addition to a candidate for being the person himself/herself having the highest possibility of being the authentication target, a different user having a possibility of being an authentication target that is so high that it is not to be ignored. In such a case, in the first embodiment as described above, the controller 301 synthesizes the access rights of both the candidate for being the person himself/herself having the highest possibility of being an authentication target and the different user having a possibility of being an authentication target that is so high that it is not to be ignored, and grants the access right to the authentication targets. Then, on the basis of the access control information 501 obtained by synthesizing the access rights, access control is performed on the access request of the authentication-target user. Accordingly, even when for example the authentication accuracy is low as a result of authentication so that a user different from the candidate for being the person himself/herself having the highest possibility of being the authentication target is the authentication-target user and false authentication occurs, a situation is prevented in which a user not having an access right accesses the resource.

First Variation Example

Next, a variation example of the first embodiment will be explained. In the above embodiment, explanations were given for an example in which information of access control is registered in the access control list 500 for each user. However, the embodiments are not limited to this example. For example, information of access control may be registered in the access control list 500 for each role in a different embodiment. A role may be for example grouping that defines a relationship between the person having a resource for which access control is defined by the access control list 500 and a different person. In one example, a role may include a superior, a member of the project team to which the person having a corresponding resource belongs, an employee of the same company, a customer, etc.

FIG. 10A, FIG. 10B and FIG. 10C illustrate an example of access control in a case when a role is used. FIG. 10A illustrates a table indicating, for each of the registered users, a probability of the authentication-target user illustrated in FIG. 4B being that registered user. FIG. 10B is role information 1001 that associates a registered user and a role assigned to the registered user. Also, FIG. 10C is an example of the access control list 500 of a first variation example in which a role and access authority for a resource are registered.

In this example, the controller 301 extracts user A, user B1 and user B2 as user candidates from the table of FIG. 10A in a case when, similarly to the case of FIG. 4A and FIG. 4B, threshold θ for extracting an authentication target user candidate is 10%. Next, the controller 301 treats, as the candidate for being the person himself/herself, user A having the highest probability from among the extracted authentication target user candidates, i.e., user A, user B1 and user B2. Then, the controller 301 reads, from the storage 302, the role information 1001 (FIG. 10B) that specifies user A as the person himself/herself and the access control list 500 (FIG. 10C) that specifies user A as the person himself/herself. The controller 301 identifies the roles that are respectively assigned to the user candidates, i.e., user A, user B1 and user B2, from the read role information 1001 of user A. In these examples, the controller 301 identifies the person himself/herself, a team member, and an employee as the roles of user A, user B1 and user B2, respectively. Then, the controller 301 identifies the access authority for the identified role from the access control list 500 of the first variation example of FIG. 10C. The controller 301 for example synthesizes access rights corresponding to the respective roles assigned to user candidates, and generates the access control information 501 illustrated in FIG. 5B.

As described above, even when registered users are changed frequently, access control using roles makes it possible to make the roles correspond to registered users by updating the role information 1001. In other words, because it is made possible to update and change the access control for each group of roles for example, the cost of maintenance is reduced.

Second Variation Example

Figure 11A:
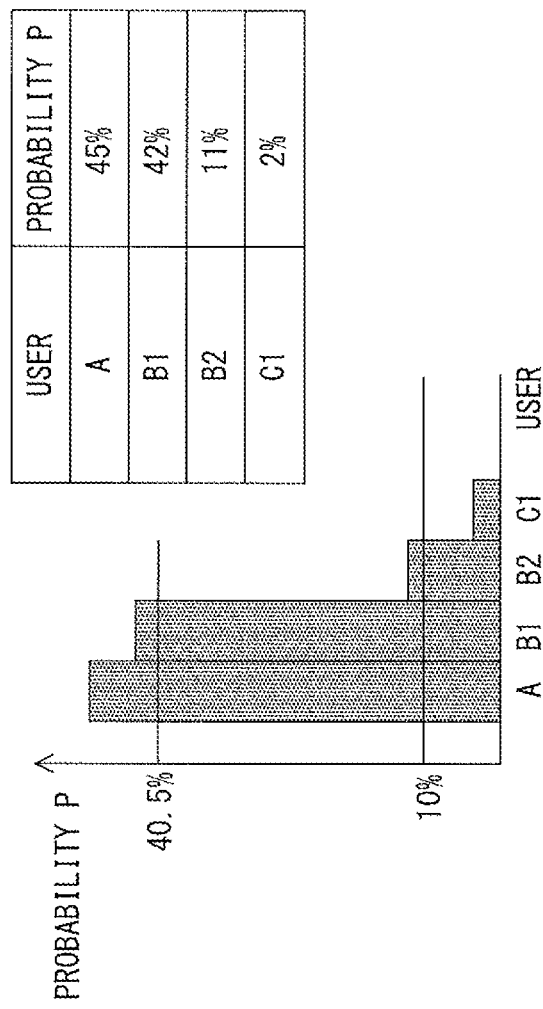

In the first embodiment, there is a case where the probability of the registered user identified as the candidate for being the person himself/herself having the highest probability of being an authentication-target user and a probability of a registered user identified as a false-authentication candidate having a probability equal to or higher than a threshold θ are close to each other. FIG. 11A, FIG. 11B, FIG. 11C and FIG. 11D illustrate an example in which a probability of a candidate for being the person himself/herself and a probability of being a false-authentication candidate are close to each other. In FIG. 11A, the probabilities for user A and user B1 are both high, and are close to each other. When the probabilities of a plurality of users are close to each other as described above, it is sometimes difficult to determine which of the access control lists 500 of user A and user B1 it is appropriate to use for generating access control information.

In view of this, in the second variation example, a second threshold is set for extracting user candidates having probabilities that are close to each other. In the example of FIG. 11A for example, a second threshold is set to be 40.5%, and user A and user B1 having a value equal to or higher than the second threshold are extracted as the user candidates having close probabilities. Note that the second threshold may be set so that it becomes γPmax (γ is a set value satisfying 0<γ≤1) when the maximum probability from among registered users is Pmax. Note that γ may be set to a value that makes it possible to extract a user candidate having a probability that is close to Pmax, and a value for example that is equal to or greater than 0.8 and smaller than 1 may be set for γ. In an example, γ may satisfy γ=0.9.

Also, when there is a registered user having a probability equal to or higher than the second threshold, the controller 301 determines that there are registered users having probabilities close to each other, and regards all of the users having probabilities equal to or higher than the second threshold as candidates for being the person himself/herself so as to read the access control lists 500 of candidates for being the person himself/herself from the storage 302. In the example of FIG. 11A, the access control list 500 of user A illustrated in FIG. 11B is first extracted as the access control list 500 of a candidate for being the person himself/herself. Further, a user having a probability that is equal to or higher than 40.5%, which is obtained by multiplying 0.9 as γ with the probability of user A having the highest probability, also becomes a candidate for being the person himself/herself. Because the probability of user B1 is 42% in the example of FIG. 11A, the controller 301 also reads the access control list 500 of user B1, which is illustrated in FIG. 11C. Then, the controller 301 synthesizes the access control list 500 of user A, who is the read candidate for being the person himself/herself (FIG. 11B) and the access control list 500 of user B1 (FIG. 11C) so as to generate a synthesized access control list 1100 illustrated in FIG. 11D. For example, the controller 301 synthesizes an access right granted to user A, who is the candidate for being the person himself/herself in the access control list 500 of user A, and an access right granted to user B1, who is the candidate for being the person himself/herself in the access control list 500 of user B1. Note that in this synthesization, for example the controller 301 may grant an access right to a resource that is permitted to user A and user B1, who are candidates for being the person himself/herself in both of the access control lists 500. For example, in the example of FIG. 11D, the company's name, the schedule and the report are permitted to the candidate for being the person himself/herself.

Also, for an access right to a resource of a user other than a candidate for being the person himself/herself, the controller 301 permits an access to a resource also permitted in the access control list 500 of any candidate for being the person himself/herself. For example, an access to a resource permitted in both the access control list 500 of user A and the access control list 500 of user B1 is permitted to a certain user in the synthesized access control list 1100. In the example of FIG. 11A through FIG. 11D, for user B2, the controller 301 permits, in the synthesized access control list 1100, only the company's name, which is permitted in both the access control list 500 of user A and the access control list 500 of user B. Similarly for user C1, the controller 301 permits an access to the company's name in the synthesized access control list 1100.

Then, in S905 above, in the generated synthesized access control list 1100, the controller 301 obtains a product set of access rights permitted to the users extracted as the authentication target user candidates in S904, and performs access control.

It is assumed for example that there is a different registered user having a probability that is high, in a prescribed error scope, at a similar level to the registered user having the highest probability of being the authentication target, and it is thus difficult to identify one candidate for being the person himself/herself. In the second variation example as described above, the controller 301 in such a case treats each of the registered users having close probabilities as a candidate for being the person himself/herself. Then, the controller 301 permits an access to a resource to which an access is permitted in the access control list of both of the candidates for being the person himself/herself. Thereby, an unauthenticated access based on a false determination in authentication is suppressed regardless of who from among the candidates for being the person himself/herself is the actual authentication-target user, and an access right having a high safety is granted. Note that the number of candidates for being the person himself/herself is not limited to two, and the second variation example may similarly be applied to a case when there are three or more candidates for being the person himself/herself having close probabilities.

Third Variation Example

While the above example is an example in which the access control list 500 of an identified candidate for being the person himself/herself is read so as to perform processes and the access control list 500 is generated for each user, the embodiments are not limited to this. For example, one access control list 500 may be set for all registered users. Also, in access control related to certain control etc. of a certain device, one access control list 500 may be set for the device for example.

Figure 12B:
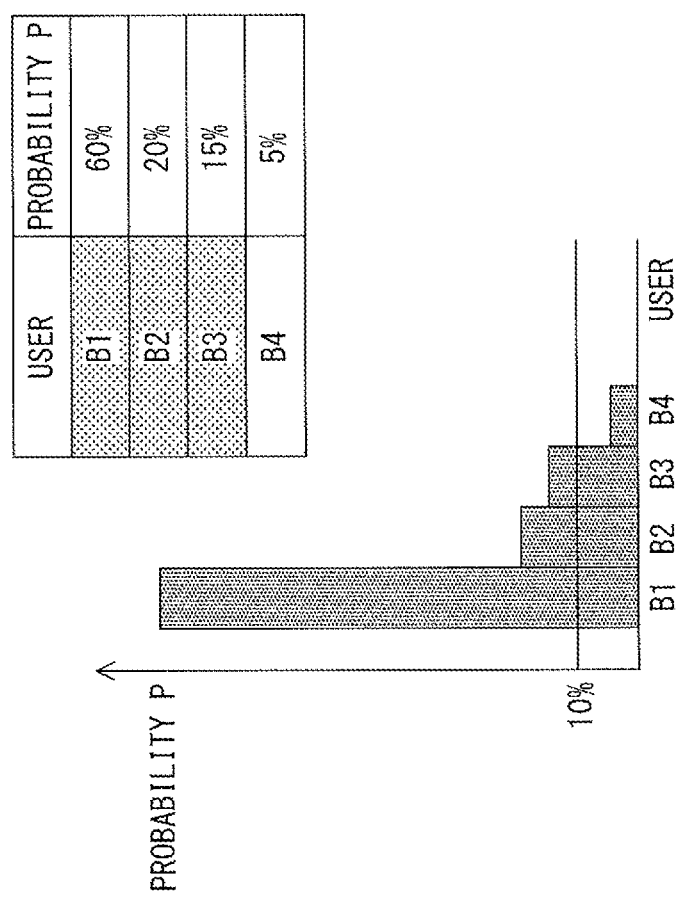

FIG. 12A and FIG. 12B illustrate an example of authentication in a case when the access control list 500 specifying an access right related to control of an air conditioner is used.

FIG. 12A illustrates an example of the access control list 500 related to an air conditioner, and an access right is set for each of a plurality of users who use the air conditioner. In the example of FIG. 12A, user B1 is permitted accesses to resources such as the ON/OFF switching control, the temperature setting, the setting of the level of output, the setting of the timer, etc. for the air conditioner. Meanwhile, accesses to some resources are rejected for user B2, user B3 and user B4.

FIG. 12B illustrates an example of results of authentication performed on the authentication-target user, and user B1, user B2 and user B3 are extracted as users having probabilities equal to or higher than threshold θ (10%) as candidates for the authentication-target user. In such a case, in the access control list 500 of FIG. 12A, accesses to the resources of the ON/OFF and the temperature setting, to which accesses are permitted to all of users B1, B2 and B3, are permitted to the authentication-target user.

As described above, the access control list 500 may be generated for a device instead of being generated for each user. Also, in this case, the controller 301 of the information processing apparatus 100 in S903 above may obtain the access control list 500 from a storage device included in a control target device such as an air conditioner etc. via wireless communications.

Second Embodiment

In the above first embodiment, a probability of being the authentication-target user is calculated for each registered user and access rights to resources of authentication-target user candidates having high probabilities are synthesized so as to determine the access right for the authentication-target user. In the second embodiment, the controller 301 for example calculates a determination mistake rate, which represents a possibility that an access to a resource has been erroneously permitted to a user not having the access right, from a probability of being the authentication target, which was calculated for each of the registered users. Then, the controller 301 uses the calculated determination mistake rate to grant an access right to the authentication-target user. This makes it possible to dynamically grant an access right in accordance with the reliability of the authentication while reducing a possibility that an unintended user will access a resource through false authentication. Hereinafter, the second embodiment will be explained.

By referring to FIG. 13A, FIG. 13B and FIG. 13C, the calculation of a determination mistake rate according to the second embodiment will be explained. FIG. 13A illustrates an example of a probability of being the authentication target for each of the registered users. FIG. 13B illustrates an example of the access control list 500 of user A, who has the highest probability of being the authentication target. The controller 301 calculates a determination mistake rate illustrated in FIG. 13C from the probability of being the authentication target illustrated in FIG. 13A and the access control list 500 illustrated in FIG. 13B.

A determination mistake rate may be calculated for example for each resource that is registered in the access control list 500. For example, a determination mistake rate is calculated by adding the probabilities of users for which rejection (cross mark) is set in the resources that are calculation targets of a determination mistake rate from among the registered users included in the access control list 500. In the example of FIG. 13C, the resource of a company's name is permitted to all registered users, which results in a determination mistake rate of 0%. Meanwhile, for the schedule, rejection is set for user C1, user C2, user C3 and user C4. Accordingly, 10%, which is a result of adding 4%, 4%, 1% and 1%, which are the probabilities of user C1, user C2, user C3 and user C4, respectively, is the determination mistake rate. Similarly, for the resources of the report and the mail as well, the determination mistake rate is calculated.

The controller 301 permits the authentication-target user for example an access to a resource having a determination mistake rate equal to or lower than a tolerable mistake rate β from among the calculated determination mistake rates. In FIG. 13C, for example, because a tolerable mistake rate β=15% is set, the controller 301 generates the access control information 501 that permits accesses to the company's name and the schedule. Tolerable mistake rate β may be set for example in accordance with an authentication scheme, the policy of the user corresponding to the access control list 500, etc.

Even when a determination mistake rate is used, dynamic change may be made to a resource that is permitted to an authentication-target user according to an authentication result. FIG. 14 illustrates an example of the calculation of a determination mistake rate from a different authentication result. In the example of FIG. 14, adding the probabilities of user C1, user C2, user C3 and user C4, who have been rejected for the schedule, results in 21%, which exceeds the tolerable mistake rate β=15% for the schedule. Accordingly, the controller 301 sets rejection to an access to the schedule made by the authentication-target user in the access control information 501. As described above, resources for which access rights are granted to the authentication-target user may be determined dynamically in accordance with a probability of being the authentication-target user for each registered user that is obtained as a result of authentication. Also, in the second embodiment, even when there is a possibility of the authentication-target user being a user that does not have an access right to a resource, an access right to the resource is granted in a case when that probability is low to a tolerable level. This can increase the number of resources that the authentication-target user can access in a scope in accordance with the tolerable mistake rate R, leading to improved user convenience, in comparison with the first embodiment.

Figure 15:
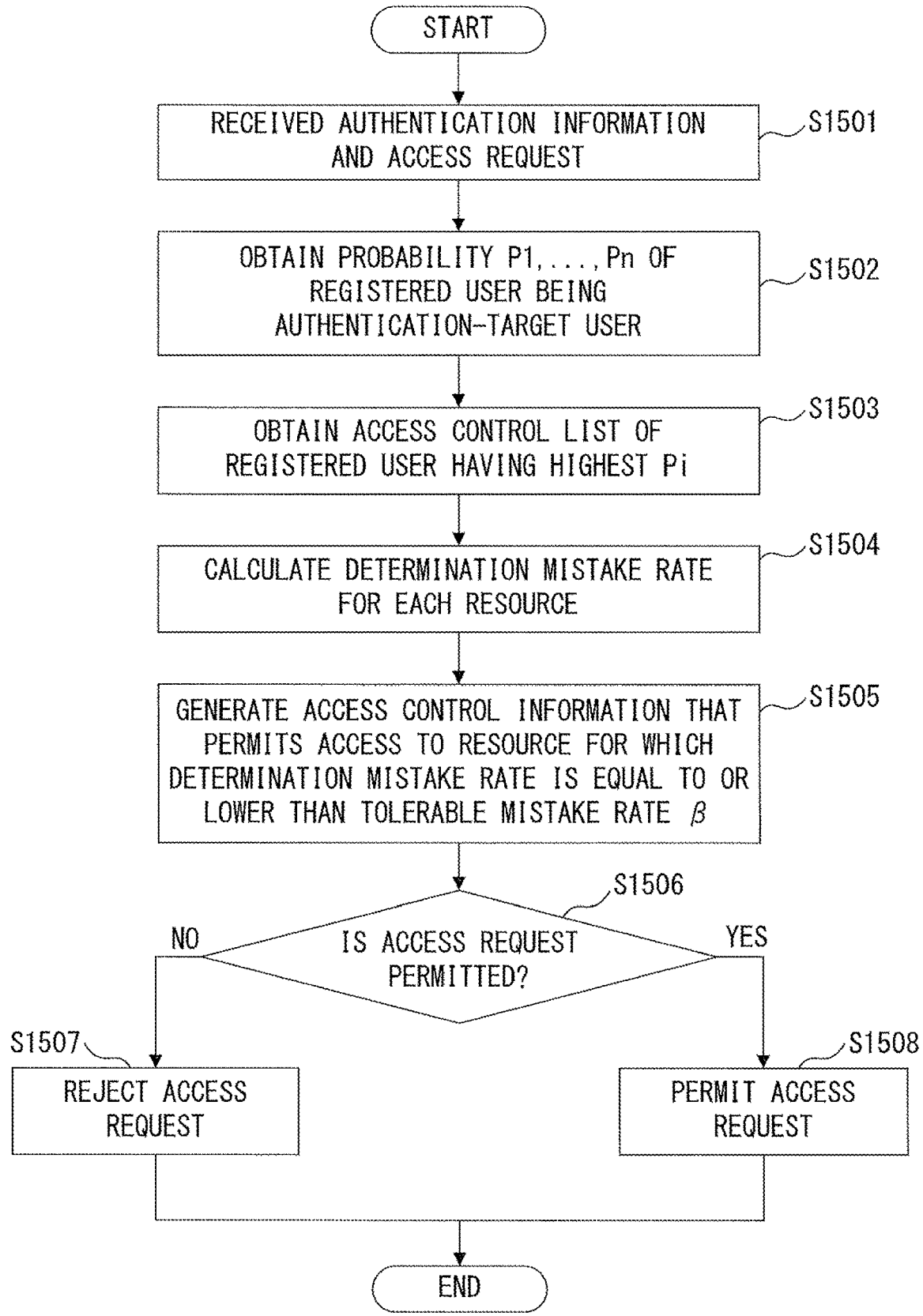
FIG. 15 is an example of an operation flow of an access control process according to the second embodiment.

FIG. 15 is an example of an operation flow of an access control process according to the second embodiment. The controller 301 of the information processing apparatus 100, when activated, starts an access control process according to the second embodiment of FIG. 15.

The processes from S1501 through S1503 correspond to the processes from S901 through S903 of FIG. 9, and the controller 301 performs, in S1501 through S1503, processes similar to the processes from S901 through S903.

In S1504, the controller 301 calculates a determination mistake rate from a probability of being the authentication-target user calculated for each of the registered users and the access control list 500 of the user having the highest probability of being the authentication-target user identified in S1503. For example, as explained by referring to FIG. 13A through FIG. 13C, the controller 301 may for example calculate a determination mistake rate for each resource by obtaining the sum of probabilities of the registered users for which the accesses are set to be rejected (cross mark) being the authentication-target user.

In S1505, the controller 301 generates the access control information 501 that sets, as a resource to which an access is to be permitted, a resource for which the calculated determination mistake rate is equal to or lower than a tolerable mistake rate β that is set in advance.

In S1506, the controller 301 determines whether or not an access request that the authentication-target user input in S1501 is permitted in the generated access control information 501. When the access request is not permitted in the access control information 501 (NO as the determination result in S1506), the flow proceeds to S1507, the controller 301 rejects the access request of the authentication-target user, and the present operation flow is terminated. When the access request is permitted in the access control information 501 (YES in the determination result in S1506), the flow proceeds to S1508, the controller 301 permits the access request of the authentication-target user, and the present operation flow is terminated. In such a case, the authentication-target user operates for example the information processing apparatus 100, and thereby can access the authenticated resource.

As described above, in the second embodiment, a determination mistake rate is calculated according to a probability of being the authentication target for each registered user that is obtained as a result of authentication, and access rights of a plurality of registered users are synthesized in accordance with the determination mistake rate. Accordingly, dynamic control is performed for an access right that is granted to the authentication-target user. Also, in the second embodiment, even though there is a possibility of being a user who does not have an access right, an access is permitted when the probability is low to a tolerable level. Accordingly, compared with the first embodiment, resources allowable to be accessed from the authentication-target user increase in a scope in accordance with tolerable mistake rate improving user convenience.

Note that the controller 301 operates as for example the computation unit 311 in the processes in S902 of FIG. 9 and S1502 and S1504 of FIG. 15 in the above embodiment. Also, the controller 301 operates as for example the setting unit 312 in the above processes in S905 of FIG. 9 and S1505 of FIG. 15. The controller 301 operates as for example the permission unit 313 in the above processes in S907 of FIG. 9 and S1507 of FIG. 15.

While the embodiments have been exemplified through the above explanations, the embodiments are not limited to them. For example, the above operation flows are illustrative, and the embodiments are not limited to them. When it is possible, the operation flows may be executed in different process orders, may further include a different process or may have some of the processes omitted. For example, the receiving of access requests in S901 of FIG. 9 and S1501 of FIG. 15 may be conducted at different timings such as in intervals between the processes of S905 and S906 or between the processes of S1505 and S1506.

Also, while for example an access is rejected when a request from an authentication-target user is not permitted in S907 of the first embodiment and S1507 of the second embodiment, the embodiments are not limited to this. For example, when the controller 301 does not permit a request from an authentication-target user in S907 of the first embodiment or S1507 of the second embodiment, it may further request the input of authentication information through a different authentication scheme that realizes authentication of users more accurately. In such a case, the controller 301 may return the process to S901 so as to repeat the process by using the authentication information based on the requested authentication scheme. Thereby, even when for example an access is permitted for a small number of resources and the access request is rejected as a result of the controller 301 performing authentication through a certain authentication scheme, an access right can be granted through a different authentication scheme that is more accurate. Note that fingerprint authentication, password authentication, authentication using ID cards, etc. exist as examples of a different authentication scheme that can authenticate users more accurately. Alternatively, in a different embodiment, the controller 301 may perform authentication with an increased accuracy while maintaining user convenience by combining authentication schemes that impose a lighter burden on users such as by combining a result of face authentication with a result of voice authentication.

Also, in the above first embodiment, threshold $\theta$ may be defined in such a manner that for example $\theta=\alpha/n(0<\alpha<n)$ is satisfied. In the above equation, n represents the number of registered users and $\alpha$ represents a set value. When for example the accuracy of authentication is remarkably low and there is almost no difference in the probability that each registered user is an authentication target, the probability is equally divided for each registered user so that each registered user has a probability of 1/n. As described above, when the number of registered users increases, the probability of each registered user being the authentication target is distributed over the respective registered users, and thus the probability is under the influence of the number of the registered users. In view of this, the number n of registered users is used to set threshold $\theta$ and by for example setting threshold $\theta$ to satisfy $\theta=\alpha/n$, even when the number of registered users is changed, an appropriate threshold can be set in accordance with the number of the registered users, making it possible to appropriately select an authentication target user candidate. Also, by using setting value $\alpha$, finer adjustments of a threshold are made possible. $\alpha$ may be in a range for example between 0.8 through 1.2, and may be 1 in one example.

Also, while the above first embodiment describes an example in which access control is performed by using, for each of the users registered in the feature value information 800, a probability of an authentication-target user being that user, the embodiments are not limited to those using this probability. A different type of index value representing a possibility of an authentication target being each of a plurality of registered users may be used instead of a probability. For example, in a different embodiment, a matching degree between an amount of characteristics extracted from authentication information of an authentication target and a feature value of each of a plurality of registered users from which feature values have been obtained in advance may be used, instead of a probability, as an index value representing, for each of the plurality of registered users, a possibility of an authentication target being that registered user. Also, similarly, while the above second embodiment describes an example in which access control is performed on the basis of a determination mistake rate obtained for each resource, the embodiments are not limited to this. For example, in a different embodiment, a different type of an index value representing a degree at which a determination mistake occurs for each resource may be used instead of a determination mistake rate.

Also, while the above embodiment describes an example in which the information processing apparatus 100 performs the above processes, the above processes may be performed by a plurality of apparatuses in a shared manner by using a client-server system etc. in a different embodiment. Also, while the first embodiment describes an example of generating the access control information 501 by obtaining a logical product, the embodiments are not limited to this, and user convenience may be improved by for example using a logical addition instead of a logical product. Also, the variation example of the first embodiment may also be applied to the second embodiment.

Figure 16:
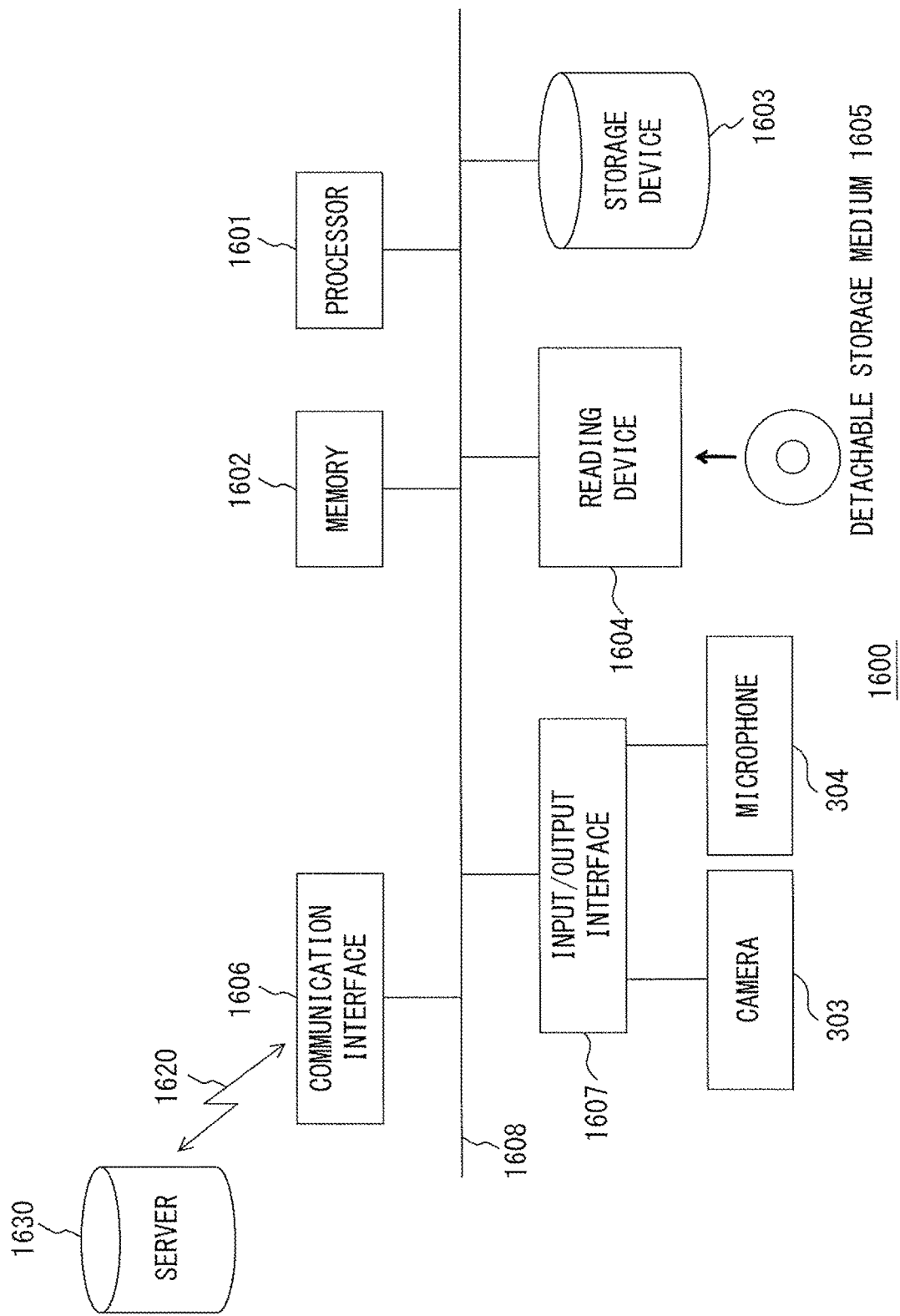
FIG. 16 illustrates an example of a hardware configuration of a computer for implementing the information processing apparatus according to the embodiments.

FIG. 16 illustrates an example of a hardware configuration of a computer 1600 for implementing the information processing apparatus 100 according to the embodiments. A hardware configuration of the computer 1600 for implementing the information processing apparatus 100 includes for example a processor 1601, a memory 1602, a storage device 1603, a reading device 1604, a communication interface 1606, an input/output interface 1607, the camera 303, and the microphone 304. The processor 1601, the memory 1602, the storage device 1603, the reading device 1604, the communication interface 1606 and the input/output interface 1607 are connected to each other via for example a bus 1608.

The processor 1601 may be for example a single processor, a multiprocessor, or a multi-core processor. The processor 1601 may use the memory 1602 to execute an access control program describing for example procedures of the above operation flows in order to provide part or all of the functions of the controller 301 described above. For example, the processor 1601 uses the memory 1602 to execute an access control program describing the procedures of the above operation flows, and thereby operates as the computation unit 311, the setting unit 312, and the permission unit 313. Also, the storage 302 may include for example the memory 1602, the storage device 1603, and a detachable storage medium 1605. The storage device 1603 of the information processing apparatus 100 stores for example the access control list 500 and the feature value information 800.

The memory 1602 is for example a semiconductor memory, and may include a RAM region and a ROM region. The storage device 1603 is for example a semiconductor memory such as a hard disk, a flash memory, etc., or an external storage device. RAM is an abbreviation for Random Access Memory. ROM is an abbreviation for Read Only Memory.

The reading device 1604 accesses the detachable storage medium 1605 in accordance with an instruction from the processor 1601. The detachable storage medium 1605 is implemented by for example a semiconductor device (USB memory etc.), a medium that information is input into and output from through magnetic effects, a medium (CD-ROM, DVD, etc.) that information is input into and output from through optical effects, or by other devices. USB is an abbreviation for Universal Serial Bus. CD is an abbreviation for Compact Disc. DVD is an abbreviation for Digital Versatile Disk.

The communication interface 1606 transmits and receives data via a network 1620 in accordance with an instruction from the processor 1601. The input/output interface 1607 is for example an interface between an input device and an output device. The input/output interface 1607 is connected to for example the camera 303, and reports an image of the authentication-target user picked up by the camera 303 to the controller 301. Also, the input/output/interface 1607 is connected to for example the microphone 304, and reports vocalizations of the authentication-target user picked up by the microphone 304 to the controller 301. Also, the input/output interface 1607 is connected to a different input device such as for example a button or a key for receiving input from the user. The input/output interface 1607 is connected to for example a display device such as a display and an output device such as a speaker, a sound device, etc. The input/output interface 1607 may further be connected to an input/output device such as a touch panel.

Note that the hardware configuration of the computer 1600 illustrated in FIG. 16 is illustrative, and the embodiments are not limited to this. When for example an embodiment does not employ voice authentication, the microphone 304 may be omitted. Also, when an embodiment does not employ face authentication, the camera 303 may be omitted.

The respective programs according to the embodiments are provided to the information processing apparatus 100 in for example the following forms: (1) Provided in a state wherein they have already been installed in the storage device 1603; (2) Provided through the detachable storage medium 1605; and (3) Provided from the server 1630 such as a program server.

Note that the hardware configuration of the computer 1600 for implementing the information processing apparatus 100 described by referring to FIG. 16 is illustrative, and the embodiments are not limited to this. For example, part or all of the functions of the above function units may be implemented as hardware by using an FPGA, an SoC, etc. Note that FPGA is an abbreviation for Field Programmable Gate Array. SoC is an abbreviation for System-on-a-chip.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising
a memory, and
a processor that is coupled to the memory and that is configured to perform a process including:
calculating, for each of a plurality of registered users from which feature values have been obtained in advance, an index value indicating a probability of an authentication target being that registered user based on a matching degree between a feature value extracted from authentication information obtained from the authentication target and a feature value of that registered user;
identifying, as authentication target candidates, certain users from among the plurality of registered users, each of the authentication target candidates having the index value indicating the probability higher than a threshold;
setting a synthesized access right by synthesizing an access right of a certain registered user to a plurality of resources and an access right of a different registered user to the plurality of resources, the certain registered user being one of the authentication target candidates, the different registered user being one of the authentication target candidates except for the certain registered user; and
permitting the authentication target an access to a resource to which an access is permitted in the synthesized access right.

2. The information processing apparatus according to claim 1, wherein
the certain registered user is a registered user who is estimated to have a highest probability of being the authentication target from among the plurality of registered users based on the index value.

3. The information processing apparatus according to claim 1, wherein
the threshold is set based on a number of the plurality of registered users.

4. The information processing apparatus according to claim 1, wherein
the synthesized access right permits an access to a resource to which an access is permitted in both an access right granted to the certain registered user to the plurality of resources and an access right granted to the different registered user to the plurality of resources.

5. The information processing apparatus according to claim 1, wherein
the process further includes obtaining, for each of the plurality of resources, a second index value, which represents a probability of a determination mistake in which the authentication target is permitted an access in spite of the authentication target not being permitted an access to the resource, based on the index value representing a probability, obtained for a registered user who is not permitted an access to the resource, of being the authentication target from among the plurality of registered users, and
the synthesized access right permits an access to a resource for which the second index value is smaller than a threshold.

6. The information processing apparatus according to claim 1, further comprising
a storage that stores a plurality of sets respectively in association with the plurality of registered users, each of the sets including the access rights to the plurality of resources of each of the plurality of registered users, wherein
when it is determined based on the index value that there is a different registered user having a probability of being the authentication target that is close to a probability of the certain registered user in a prescribed error scope, the synthesized access right is set by synthesizing an access right granted to the certain registered user in a first set associated with the certain registered user from among the plurality of sets, an access right granted to the different registered user in the first set, an access right granted to the certain registered user in a second set that is associated with the different registered user from among the plurality of sets, and an access right granted to the different registered user in the second set.

7. An access control method that is executed by an information processing apparatus, the access control method comprising:
calculating, for each of a plurality of registered users from which feature values have been obtained in advance, an index value indicating a probability of an authentication target being that registered user based on a matching degree between a feature value extracted from authentication information obtained from the authentication target and a feature value of that registered user;
identifying, as authentication target candidates, certain users from among the plurality of registered users, each of the authentication target candidates having the index value indicating the probability higher than a threshold;
setting a synthesized access right by synthesizing an access right of a certain registered user to a plurality of resources and an access right of a different registered user to the plurality of resources, the certain registered user being one of the authentication target candidates, the different registered user being one of the authentication target candidates except for the certain registered user; and
permitting the authentication target an access to a resource to which an access is permitted in the synthesized access right.

8. The access control method according to claim 7, wherein
the certain registered user is a registered user who is estimated to have a highest probability of being the authentication target from among the plurality of registered users based on the index value.

9. The access control method according to claim 7, wherein
the threshold is set based on a number of the plurality of registered users.

10. The access control method according to claim 7, wherein
the synthesized access right permits an access to a resource to which an access is permitted in both an access right granted to the certain registered user to the plurality of resources and an access right granted to the different registered user to the plurality of resources.

11. The access control method according to claim 7, further comprising
obtaining, for each of the plurality of resources, a second index value, which represents a probability of a determination mistake in which the authentication target is permitted an access in spite of the authentication target not being permitted an access to the resource, based on the index value representing a probability, obtained for a registered user who is not permitted an access to the resource, of being the authentication target from among the plurality of registered users, wherein
the synthesized access right permits an access to a resource for which the second index value is smaller than a threshold.

12. The access control method according to claim 7, wherein
a plurality of sets each including the access rights to the plurality of resources of each of the plurality of registered users are set, respectively in association with the plurality of registered users, in a storage included in the information processing apparatus, and
when it is determined based on the index value that there is a different registered user having a probability of being the authentication target that is close to a probability of the certain registered user in a prescribed error scope, the synthesized access right is set by synthesizing an access right granted to the certain registered user in a first set associated with the certain registered user from among the plurality of sets, an access right granted to the different registered user in the first set, an access right granted to the certain registered user in a second set that is associated with the different registered user from among the plurality of sets, and an access right granted to the different registered user in the second set.

13. A non-transitory computer-readable recording medium having stored therein a program that causes a computer to execute a process comprising:
calculating, for each of a plurality of registered users from which feature values have been obtained in advance, an index value indicating a probability of an authentication target being that registered user based on a matching degree between a feature value extracted from authentication information obtained from the authentication target and a feature value of that registered user;
identifying, as authentication target candidates, certain users from among the plurality of registered users, each of the authentication target candidates having the index value indicating the probability higher than a threshold;
setting a synthesized access right by synthesizing an access right of a certain registered user to a plurality of resources and an access right of a different registered user to the plurality of resources, the certain registered user being one of the authentication target candidates, the different registered user being one of the authentication target candidates except for the certain registered user; and permitting the authentication target an access to a resource to which an access is permitted in the synthesized access right.

14. The non-transitory computer-readable recording medium according to claim 13, wherein the certain registered user is a registered user who is estimated to have a highest probability of being the authentication target from among the plurality of registered users based on the index value.

15. The non-transitory computer-readable recording medium according to claim 13, wherein the threshold is set based on a number of the plurality of registered users.

16. The non-transitory computer-readable recording medium according to claim 13, wherein the synthesized access right permits an access to a resource to which an access is permitted in both an access right granted to the certain registered user to the plurality of resources and an access right granted to the different registered user to the plurality of resources.

17. The non-transitory computer-readable recording medium according to claim 13, wherein the process further includes obtaining, for each of the plurality of resources, a second index value, which represents a probability of a determination mistake in which the authentication target is permitted an access in spite of the authentication target not being permitted an access to the resource, based on the index value representing a probability, obtained for a registered user who is not permitted an access to the resource, of being the authentication target from among the plurality of registered users, and the synthesized access right permits an access to a resource for which the second index value is smaller than a threshold.

18. The non-transitory computer-readable recording medium according to claim 13, wherein a plurality of sets each including the access rights to the plurality of resources of each of the plurality of registered users are set, respectively in association with the plurality of registered users, in a storage included in the computer, and when it is determined based on the index value that there is a different registered user having a probability of being the authentication target that is close to a probability of the certain registered user in a prescribed error scope, the synthesized access right is set by synthesizing an access right granted to the certain registered user in a first set associated with the certain registered user from among the plurality of sets, an access right granted to the different registered user in the first set, an access right granted to the certain registered user in a second set that is associated with the different registered user from among the plurality of sets, and an access right granted to the different registered user in the second set.

\* \* \* \* \*